United States Patent [19]

Laidler et al.

[11] 3,804,652

[45] Apr. 16, 1974

[54] METHOD OF PRODUCING CALCIUM SILICATE PRODUCTS

[75] Inventors: Thomas Gordon Laidler; Dennis Booth, both of Darlington, England

[73] Assignee: The Chemical & Insulating Company Limited, London, England

[22] Filed: Sept. 1, 1971

[21] Appl. No.: 177,059

Related U.S. Application Data

[63] Continuation-in-part of Ser. No. 766,069, Oct. 9, 1968, abandoned.

[30] Foreign Application Priority Data

Dec. 27, 1967 Great Britain .................... 58651/67

[52] U.S. Cl. ................................ 106/118, 106/120
[51] Int. Cl. ............................................. C04b 15/12
[58] Field of Search ............................. 106/118, 120

[56] References Cited
UNITED STATES PATENTS

| | | | |
|---|---|---|---|
| 3,257,220 | 6/1966 | Kalousek et al. | 106/120 |
| 3,501,324 | 3/1970 | Kubo | 106/120 |
| 3,754,547 | 7/1956 | Allen | 106/120 |
| 2,716,070 | 8/1955 | Seipt | 106/120 |
| 3,449,141 | 6/1969 | Binkley et al. | 106/120 |
| 3,574,113 | 4/1971 | Shannon | 106/120 |

*Primary Examiner*—James E. Poer
*Attorney, Agent, or Firm*—Hofgren, Wegner, Allen, Stellman & McCord

[57] ABSTRACT

A method of producing calcium silicate products, such as drain pipes and insulating material, by allowing an aqueous solution of calcium chloride to react with an aqueous solution of an alkali metal silicate to produce a suspension of calcium trisilicate which is then filtered to form a cake that is washed as free as possible from sodium chloride. The cake may then be resuspended and reacted with hydrated lime at an elevated temperature, divided into a plurality of units which set to a self-supporting state by moulding in the presence of an alumina bearing substance, after which the units are autoclaved in saturated steam at superatmospheric pressure to form in the product 11 Au tobermorite having the empirical formula 5 $CaO$: 6 $SiO_2$: 5 $H_2O$.

8 Claims, 2 Drawing Figures

METHOD OF PRODUCING CALCIUM SILICATE PRODUCTS

CROSS-REFERENCES TO RELATED APPLICATIONS

This application is a continuation-in-part of our copending U.S. Pat. application No. 766,069, filed Oct. 9, 1968, now abandoned.

BACKGROUND OF THE INVENTION

Efforts have been made to develop thermal insulating materials which use little or no asbestos, but without success. Satisfactory insulating products must withstand and remain stable at temperatures of the order of 900° C., and must be structurally strong enough for their intended purposes. The raw materials must be readily available, relatively inexpensive, and capable of being worked to the finished form of tubes, pipes, slabs, panels, blocks or other desired shapes in relatively simple types of manufacturing equipment and processes at a reasonable manufacturing cost.

Allen U.S. Pat. No. 2,754,547 shows that calcium silicate materials have been proposed for heat insulating products. The prior art calcium silicate heat insulating products either lack adequate mechanical strength and resistance to high temperatures, or can be produced only by methods which are not economically sound, or both.

SUMMARY OF THE INVENTION

We have found that by reacting a calcium trisilicate with hydrated lime at an elevated temperature, solidifying the material in the presence of a limited quantity of an alumina-bearing material, such as kaolin, to the point that it is a self-supporting solid, and then autoclaving the self-supporting materials, the finished product contains the form of calcium silicate hydrate known as 11 Au tobermorite. The finished product is stable up to temperatures of 900° C., or thereabouts, has a very low average linear shrinkage during drying, has a relatively low average density of 11.1 pounds per cubic foot, has an average modulus of rupture of 84 pounds/inch$^2$, and is free from warping, distortion or excessive shrinkage when subjected to a temperature of 900° C. for an extended period of time.

The ratio of alumina-bearing substances to other solids in the slurry during setting and autoclaving must be held within definite limits because too little alumina-bearing material in the reaction will fail to produce the desired conversion to 11 Au tobermorite, while the use of an excessive amount of alumina will produce hydrogarnets, i.e., substances in the system $CaO-Al_2O_3-SiO_2-H_2O$, and these are substantially weaker than tobermorite and give higher linear shrinkages on heating. Accordingly, their formation must be avoided.

As will be described in detail, the individual units of the product in the form of molded pipe, slabs, blocks or the like, may be produced either be precision moulding or by pressure moulding; and the processes differ for the two moulding techniques.

The present invention comprises the method of making a calcium silicate product comprising, preparing an aqueous suspension of calcium trisilicate by reacting an aqueous solution of a water soluble calcium salt and an aqueous solution of an alkali metal silicate having a silica to alkali oxide molecular ratio of about 2–4 to 1, reacting an aqueous suspension of said calcium trisilicate with aqueous lime at an elevated temperature to form a composition having a calcium oxide to silica molecular ratio of about 0.75–1.0 to 1, moulding said composition in the presence of 1.5 percent to 5 percent of alumina to produce a self-supporting formed product and autoclaving the formed product in an atmosphere comprising steam at superatmospheric pressure to form in said product a substantial amount of 11 Au tobermorite having the empirical formula 5 CaO: 6 $SiO_2$: 5 $H_2O$ without the formation of a substantial amount of any other calcium silicate hydrates.

DETAILED DESCRIPTION OF THE INVENTION

Calcium trisilicate is preferably prepared in the form of a suspension by reacting an aqueous solution of a water soluble calcium salt with an aqueous solution of an alkali metal silicate. The preferred calcium salt solution is a calcium chloride solution containing between 50 and 150 grams per litre of calcium chloride; while the preferred alkali metal silicate solution contains between 5 percent and 15 percent by weight of sodium silicate with a silica to alkali oxide molecular ration of about 2–4 to 1. The proportion of the reactants is adjusted to ensure that the calcium chloride is present in slight excess.

The mixing of the calcium chloride and alkali metal silicate solutions to form the calcium trisilicate suspension may be effected by any convenient method which causes the solutions to be rapidly and intimately mixed. For example the alkali metal silicate solution may be injected into a moving stream of calcium chloride solution and the mixed streams may then be subjected to turbulent agitation by a pump or other means adjacent to the point of mixing. The reaction which takes place in the formation of the calcium trisilicate is:

$Na_2O \cdot XSiO_2 + CaCl_2 + aq = 2NaCl + CaO \cdot XSiO_2$ + combined water where X lies between 2 and 4 inclusive. The calcium trisilicate suspension, preferably made by the above process may be filtered, e.g., by means of a rotary filter or other suitable filter to produce a cake and the cake may be washed as free as possible from soluble sodium chloride. The washed calcium trisilicate cake may then be resuspended in water, a suitable concentration being in the region of one part by weight of solids to ten parts by weight of water and the suspension may then be used to make calcium silicate insulating products either by the so-called precision moulding process or by pressure moulding.

Figure 1:
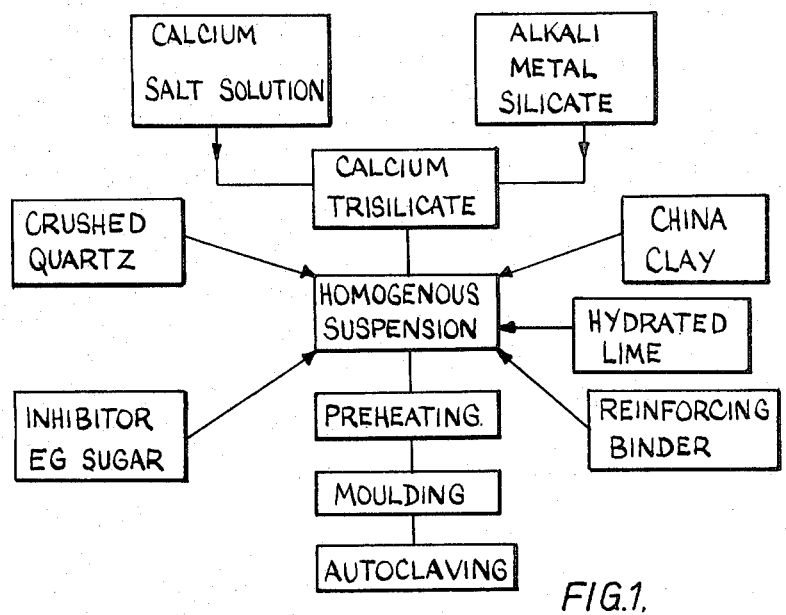
FIG. 1 is a flow diagram illustrating the steps in the method using precision moulding.

In the precision moulding process of making insulating or other products, as illustrated in FIG. 1, the following ingredients are mixed into a substantially homogeneous slurry:

a. Calcium trisilicate suspension prepared as described above.

b. Lime, preferably high purity hydrated lime containing not less than 90 percent calcium hydroxide ($Ca(OH)_2$).

c. A source of solid silica. The preferred material is crushed quartz containing not less than 90 percent silica ($SiO_2$) and being of such a fineness that at least 95 percent will pass through a '300' mesh sieve.

d. An alumina-bearing material. Kaolin (china clay) is particularly recommended, although other alumina-bearing compounds may be used.

e. An inhibitor, preferably, sugar (sucrose), to retard any reaction in the slurry prior to moulding. Sugar is the preferred retarder because it is obtainable commercially at an exceptionally high degree of purity. Other less desirable retarders include starches, flour, tartrates; lignosulphonates, tannins and other products derived from wood; borax and certain other borates; certain phosphates; and several others.

f. A reinforcing binder, for example amosite asbestos fibre. Other suitable binders may be used if desired.

g. Optionally, a source of well-crystallized calcium carbonate. Precipitated calcium carbonate, crushed chalk or whitings and crushed limestone may be used.

Our experiments have shown that an accelerator such as caustic alkali or alkali metal silicate (as frequently used in known calcium silicate slurries for precision moulding) should not be used because their use leads to the formation of calcium silicate insulation products which may shrink and crack excessively at elevated temperatures.

The proportions of the above materials to be used in preparing a precision moulding slurry or moulding composition are as follows:

a. The proportion of calcium trisilicate suspension lies between 20 and 45 percent on a dry solids basis, of the total weight of dried solids in the moulding suspension.

b. The proportion of solid silica material lies between 10 and 20 percent on a dry solids basis of the total weight of dried solids in the moulding suspension.

c. The proportion of alumina-bearing material should be such that the alumina content of the total weight of dry solids in the moulding suspension lies between 1.5 and 5 percent.

d. The proportion of sugar should be adjusted according to the thickness of preheated moulding slurry desired and proportions of between 0.5 and 1.0 percent of the weight of the total dry solids are satisfactory.

e. The proportion of hydrated lime ($Ca(OH)_2$) should preferably be calculated after deciding the proportions of the other constituents as above and must be so adjusted as to make the calcium oxide-silica molecular ratio lie between 0.75 and 1.0 and preferably between 0.83 and 0.91. In making the calculation the amounts of silica and lime in all constituents except asbestos fibre and any well-crystallized calcium carbonate used should be taken into account. These include the amounts of calcium oxide and silica in the "calcium trisilicate" used, the amount of silica in the solid silica used, the amount of silica in the alumina-bearing source used if this contains silica and the amount of calcium oxide in the hydrated lime used but the amount of calcium oxide in the calcium carbonate used should not be taken into account.

f. The amount of amosite asbestos fibre or other reinforcing material used may be added in proportions of between 5 and 15 percent of the total solids weight of the slurry as desired.

g. If well-crystallized calcium carbonate is used the amount should be less than 5 percent of the total solids weight of the slurry. It is believed to improve the dimensional stability of the final insulation at temperatures in the region of 900° C., but its use is not essential.

The above constituents may be made up to such a volume with water to form a moulding composition such that the final density of the dried insulation or other product lies between 8 and 14 lb/ft. We have found that the optimum density for strength and quality of dried insulation is about 11 lbs/ft$^3$.

All the constituents of the moulding slurry or composition preferably prepared as described above, may be intimately mixed in a suitable tank to form a substantially homogeneous suspension and the slurry so prepared may be moulded by preheating it to a temperature of between 60° and 90° C. and pouring it into vertical water-jacketed moulds of the precise shape and size required. Although the preheating temperature may lie between the above limits we have found that the optimum temperature for the best results is 80° C. The temperature in the mould water jackets is preferably at a minimum of 94° C. After leaving the slurry in the precision moulds for a suitable period, which varies with the size and thickness of the piece of insulation or other product, it is ejected or removed from the moulds as a shaped hard self-supporting mass.

The shaped set products from the precision moulds are then transferred to an autoclave where they are hydrothermally treated with a saturated steam for a period of not less than seven hours at a pressure of 190 lbs/in$^2$. Alternatively the products may be autoclaved for longer periods at a lower saturated steam pressure. We have found a period of not less than 12 hours at a pressure of 120 lbs/in$^2$ to be satisfactory. After autoclaving the calcium silicate products may be dried according to usual practice.

EXAMPLE 2,510 lbs. of a sodium silicate solution of molecular ratio $SiO_2:Na_2O$ of 3.4 occupying a volume of 180 gallons was diluted with water to a volume of 920 gallons so that the solids content of the solution was approximately 10 per cent. 560 lbs. of calcium chloride flake containing 71 percent $CaCl_2$ was dissolved in water and made up to a volume of 400 gallons with water to give a 10 percent weight by volume solution. The sodium silicate solution was injected into the calcium chloride solution through a ½ inch jet which was concentrically situated in a 3 inch pipe, the jet outlet being situated 3 inches from the inlet to a centrifugal pump through which the calcium chloride solution was being circulated. Rapid intermingling and reaction of the solutions was thus achieved. After 80 minutes all the sodium silicate solution had been added. The resultant slurry of "calcium trisilicate" was filtered and washed on a rotary filter and the filter cake resuspended in water and made up to a strength of 1 pound of solid per gallon of suspension. The suspension was then incorporated into a calcium silicate insulation moulding slurry of the following composition:

| | lbs. |
|---|---|
| "Calcium Trisilicate" – 300 gallons suspension | = 300 |
| Hydrated Lime | = 330 |
| Crushed Quartz | = 152 |
| Kaolin (China Clay) | = 46 |
| Sugar | = 9 |
| Amosite Asbestos Fibre | = 83 |
| Total Weight | = 920 |

The above ingredients were made up into a slurry of volume 450 gallons.

The calcium oxide:silica ratio of the solids in the slurry (excluding the asbestos fibre) was calculated to be 0.83. The slurry was preheated to a temperature of 80° C. and poured into moulds equipped with water jackets, the temperature of the water in the jackets being 95° C. When the insulating product was adjudged to be firm enough, it was ejected as hard, self-supporting pieces from the moulds. The pieces were then autoclaved for 7 hours in saturated steam at a pressure of 190 lbs/in. After being autoclaved the articles were dried. The average linear shrinkage on drying was found to be 0.1 percent. The average density of the dried pieces was 11.1 lbs/ft$^3$, and the average modulus of rupture of the dried pieces was 84 lbs/in$^2$. In a soaking test where 6 inches × 2 inches × 1 inch cut specimens of the insulating product were placed at a temperature of 900° C. in a furnace for 24 hours, the average linear shrinkage was 1.50 percent and the pieces did not warp or distort.

Figure 2:
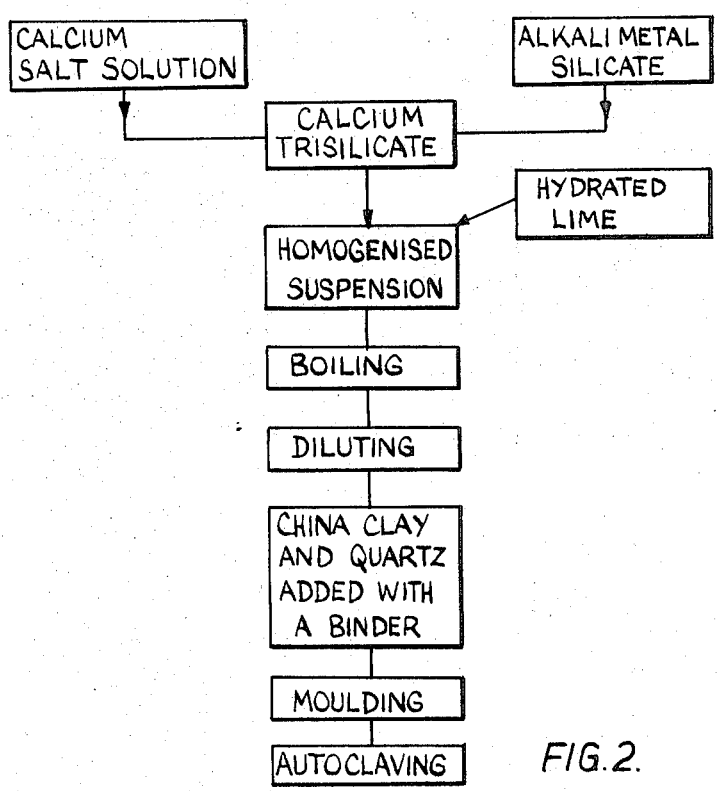
FIG. 2 is a flow diagram illustrating the steps in the method using pressure moulding.

The procedure to be used for the production of calcium silicate products in a process where the moulding suspension is forced under pressure into moulds of the desired shape, and there filtered, is as follows, and is shown diagrammatically in FIG. 2.

The composition of the suspension is to be decided on the principles stated above for the preparation of suspensions intended for production by precision-moulding. The preferred procedure differs, however, in that to attain insulation of sufficiently low density it is desirable to pre-react the "calcium trisilicate" in the composition with the hydrated lime. To carry out the pre-reaction, the required amount of "calcium trisilicate" suspension is placed in a vessel into which live steam can be injected and which is equipped with a powerful circulating pump, and is diluted to a maximum concentration of 0.4 lbs/gallon, to avoid the suspension becoming too thick in subsequent operations. The calculated amount of hydrated lime is added to the "calcium trisilicate" suspension whilst the latter is being circulated. When adequate mixing has taken place the suspension is heated by means of live steam, until boiling takes place. Boiling is continued for a period of between 5 and 30 minutes, during which time reaction takes place between the "calcium trisilicate" and the hydrated lime, which is indicated by considerable thickening of the slurry. At the end of the boiling period, the live steam is turned off and the suspension cooled by the addition of an equal volume of cold water. The other ingredients, e.g., solid silica, an alumina-bearing substance, and asbestos fibre and well-crystallized calcium carbonate if desired are now intimately mixed into the suspension. Sugar is not used in the pressure-moulding process as no retardation of the reaction is required. The suspension is then delivered to a suitable tank from which it can be delivered under pressure to mould of a desired shape, which are so constructed that excess liquid can be expressed from the moulds, leaving behind a wet mass of material of substantially the same shape as the mould. The moulded masses are transferred to an autoclave in which they are hydrothermally treated in saturated steam at a pressure of 190 lbs/in$^2$ for not less than 7 hours; or if a lower steam pressure is used, then for a longer period of time as previously indicated. The product is then dried to free it from uncombined water.

Thus, one important feature of this invention lies in the preparation of a finely divided suspension of "calcium trisilicate," made by the interaction of a soluble calcium salt preferably in solution and an alkali metal silicate preferably in solution, the suspension being reacted with lime to produce a calcium silicate composition.

When used in the precision-moulding process as described above, the calcium trisilicate suspension imparts a sufficient reactivity to the composition so that no caustic alkali or alkali metal silicate accelerators need be used, which accelerators, we believe, lower the thermal stability of insulation made by this process.

The use of a finely divided "calcium trisilicate" prepared as aforesaid in a pressure-moulding process as described above, because of its high reactivity with hydrated lime, imparts to the moulding slurry when pretreated as previously described a desirable thickening which leads to the final calcium silicate insulation possessing the combination of light density with high strength.

Other features of our invention are that the use of a solid silica such as fine crushed quartz makes the calcium silicate products stronger.

All the constituents of the novel calcium silicate products may be commercially procured in a reasonable degree of purity. Thus substances such as kieselguhr are not required. The use of such materials may introduce into the product varying amounts of alumina, producing an irregular composition and resulting products.

It will be understood from the above that a most important feature of the invention is that the calcium silicate hydrate, known in the literature as 11 Au tobermorite and having an empirical formula 5 CaO : 6 SiO$_2$ : 5 H$_2$O, is formed in the products. The presence of 11 Au tobermorite in products produced according to the invention has been confirmed by X-Ray powder diffraction analysis. The most desirable molecular ratio of calcium oxide to silica is 0.83 which is the theoretical value for the same ratio in calcium silicate hydrate 11 Au tobermorite. The use of an alumina-bearing substance also reduces the shrinkage on drying of the calcium silicate material and improves the thermal stability up to temperatures of 900° C.

It has been found by experiment that satisfactory products can be made according to the invention when the molecular ratio of calcium oxide to silica in the homogeneous suspension lies between 0.75 and 1.0. At molecular ratios below 0.75, some silica remains unreacted in the product which may therefore have an undesirable high linear shrinkage when heat-soaked at high temperature. At molecular ratios above 1.0, the product is unstable, especially with regard to decomposition caused by the reaction of the product with carbon dioxide contained in the air. It has also been found that calcium silicate products made according to the invention have the most consistent physical properties when the molecular ratio of calcium oxide to silica lies between 0.83 and 0.91.

The foregoing detailed description is given for clearness of understanding only and no unnecessary limitations should be understood therefrom, as modifications will be obvious to those skilled in the art.

We claim:

1. The method of making a structurally strong, molded calcium silicate product which withstands and remains stable at temperatures of the order of 900° C, said method comprising;
   preparing calcium trisilicate in aqueous suspension by reacting an aqueous solution of a water soluble calcium salt and an aqueous solution of an alkali metal silicate having a silica to alkali oxide molecular ratio of about 2–4 to 1;
   reacting an aqueous suspension of said calcium trisilicate with aqueous lime at an elevated temperature to form a composition having a calcium oxide to silica molecular ratio of about 0.75–1.0 to 1;
   moulding said composition in the presence of 1.5 to 5 percent of alumina to produce a self supporting formed product;
   and autoclaving the formed product in an atmosphere comprising steam at superatmospheric pressure to form in said product a substantial amount of 11 Au tobermorite having the empirical formula $5CAO: 6SiO2: 5H_2O$ without the formation of a substantial amount of any other calcium silicate hydrates, said autoclaved, formed product exhibiting no substantial shrinkage during drying.

2. The method of claim 1 in which the composition is mixed with the alumina and with a reaction retarder and then preheated to a temperature of about 60°–90° C., to produce a partially reacted slurry, and said slurry is precision moulded at about 95° C.

3. The method of claim 2 wherein the amount of said calcium trisilicate is between about 20–45 percent by weight based on the solids content of said mixture, the amount of alumina on a dry basis in said mixture is about 1.5–5.0 percent by weight, the amount of reaction retarder is about 0.5–1.0 percent by weight of the dry solids and the molecular ratio of calcium oxide to silica is between about 0.83–0.91 to 1.

4. The method of claim 1 in which the composition is reacted by boiling and is then cooled, the alumina is added to provide a slurry, and the slurry is moulded under pressure while excess liquid is expressed from it.

5. The method of claim 4 in which the composition is heated by means of live steam to produce boiling.

6. The method of claim 4 in which the composition with the alumina added also contains a reinforcing binder and finely divided solid silica.

7. The method of claim 1 in which the composition with the alumina added also contains a reinforcing binder and finely divided solid silica.

8. The method of claim 6 in which the solid silica is crushed quartz containing not less than 90 percent $SiO_2$, at least 95 percent of which will pass through a 300 mesh sieve.

* * * * *